US010467788B2

(12) United States Patent
Tanda et al.

(10) Patent No.: US 10,467,788 B2
(45) Date of Patent: Nov. 5, 2019

(54) AUTOMATED ACTION SHOT GENERATION IN A DIGITAL MEDIUM ENVIRONMENT

(71) Applicant: Adobe Inc., San Jose, CA (US)

(72) Inventors: Vibha Tanda, Palam Colony (IN); Sagar Tandon, Ghaziabad (IN); Abhishek Shah, Delhi (IN)

(73) Assignee: Adobe Inc., San Jose, CA (US)

(*) Notice: Subject to any disclaimer, the term of this patent is extended or adjusted under 35 U.S.C. 154(b) by 241 days.

(21) Appl. No.: 15/586,133

(22) Filed: May 3, 2017

(65) Prior Publication Data

US 2018/0322670 A1 Nov. 8, 2018

(51) Int. Cl.
*H04N 5/225* (2006.01)
*G06T 11/60* (2006.01)
*G06K 9/00* (2006.01)
*G11B 27/34* (2006.01)
*H04N 5/93* (2006.01)

(52) U.S. Cl.
CPC .......... *G06T 11/60* (2013.01); *G06K 9/00348* (2013.01); *G06K 9/00751* (2013.01); *G11B 27/34* (2013.01)

(58) Field of Classification Search
CPC ..... G06T 11/60; G11B 27/34; G06K 9/00751; G06K 9/00348
USPC ........ 348/169; 386/224, 278, 281, 314, 326, 386/341, 353
See application file for complete search history.

(56) References Cited

U.S. PATENT DOCUMENTS

2017/0171499 A1* 6/2017 Dodballapur ............. G06T 7/20

* cited by examiner

*Primary Examiner* — Robert Chevalier
(74) *Attorney, Agent, or Firm* — SBMC

(57) ABSTRACT

Automatic frame selection and action shot generation techniques in a digital medium environment are described. A computing device identifies an object in a foreground of video data. A determination is then made by the computing device as to motion of the object exhibited between frames of the video data. A subset of frames is then selected by the computing device based on a determined motion of the identified object depicting an action sequence. An action shot is generated by the computing device by overlaying the identified objects in the selected frames on a background.

20 Claims, 6 Drawing Sheets

AUTOMATED ACTION SHOT GENERATION IN A DIGITAL MEDIUM ENVIRONMENT

BACKGROUND

An action shot is a form of time-lapse photography that captures a sequence of actions of an object across a static background in a single photograph. The action shot portrays a short story and is easy to share and view compared to watching a video. Example action shots can portray a baby's first steps, a scoring basketball shot, a sequence of dance moves, a daring parkour jump, and a challenging trick on a skateboard. In addition to capturing personal moments, action shots can capture movement of non-human or inanimate objects, including animals (e.g., flying birds, jumping dogs, running horses), celestial objects (e.g., setting sun, eclipsing moon) and technology (e.g., working robots, moving vehicles).

Conventional techniques used for generating action shots involve manually selecting individual frames from a video and stitching the frames together to create the action shot. This requires a user to manually search and filter through a large number of frames to select ideal frames for the action shot, such as frames that are in focus and capture unique actions. After selecting the frames, the user manually extracts an object or subject from the selected frames and positions the extracted objects onto a background, e.g., through interaction with a computing device. As a result, the process of generating an action shot is tedious, laborious, and time-consuming and requires photograph editing skills.

In order to reduce an amount of time it takes to manually search and filter, a user may use conventional techniques to reduce a total number of frames. For example, the user may collect fewer frames, such as by reducing a number of frames per second a camera captures and/or collecting images using a burst mode instead of using video. Alternatively, a user may use a program of a computing device to filter frames based on an interval number of frames or a predetermined time interval. For example, the program can sequentially sort through the frames and select every third frame or frames that are one second apart.

Although these conventional techniques speed up the manual process of generating the action shot, these conventional techniques may not capture or select the frames containing the best action images for use in the action shot. This is especially true when the object alternates between fast and slow motions. As such, the conventional techniques employed by a computing device may select too few frames during the fast motion such that the selected frames fail to capture ideal action moments. Additionally, the conventional techniques may select too many frames during the slow motion such that the selected frames capture redundant, overlapping instances of the object. Thus, the user may still have to filter through the selected frames to select frames for the action shot. As such, conventional methods provide a limited ability, if at all, to automatically select frames and automatically generate the action shot.

SUMMARY

Frame selection and action shot generation techniques in a digital medium environment are described in which a subset of frames are selected from video data by a computing device based on a determined motion of an object depicting an action sequence. The object in the selected frames are overlaid by the computing device on a background to generate the action shot. In this way, the frames are automatically and intelligently selected by the computing device based on the motion of the object and the action shot without manual intervention.

In one example, an object is identified by a computing device from a foreground of the video data. A determination is then made by the computing device as to motion of the object exhibited between frames of the video data. For example, the motion may include multidimensional translation and/or rotation of the object between the frames of the video data.

A subset of frames is then selected by the computing device based on the determined motion of the identified object. The selected subset of frames is then output by the computing device, e.g., in a user interface.

The selected subset of frames are used by the computing device to generate an action shot by overlaying the identified object from each of the selected frames onto a background, e.g., to generate a single frame having multiple instances of the overlaid object. In this way, the action shot is generated to efficiently and accurately express the motion of the object, which is not possible in conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
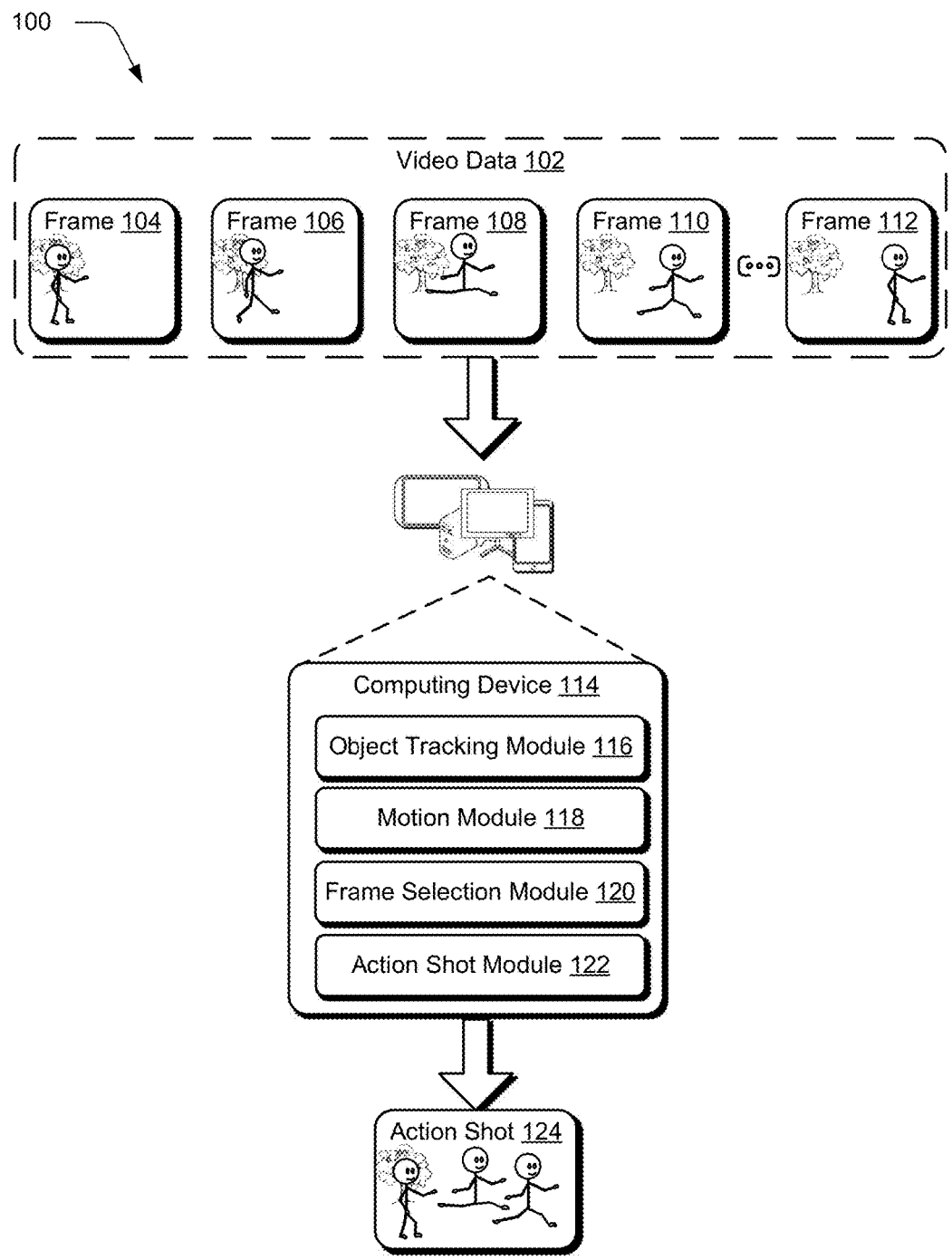
FIG. 1 is an illustration of an environment in an example implementation that is operable to employ frame selection and action shot generation techniques described herein.

Actions shots capture an action sequence of an object in a single photograph, e.g., digital image, as printed on a medium such as paper, and so forth. Conventional techniques for generating the action shots are challenging and time consuming by requiring a user to manually select a set of frames and use photographic editing skills to generate the action shot.

Accordingly, frame selection and action shot generation techniques in a digital medium environment are described. In the techniques described herein, a subset of frames is selected from video data based on motion of an object. The object in the selected frames are overlaid on a background to generate the action shot, e.g., as a single frame having multiple instances showing movement of the object.

To begin, a computing device receives video data and identifies an object in a foreground of the video data. A determination is then made by the computing device as to motion of the object exhibited between frames of the video data. For example, the motion may include translation and/or rotation of the object across multiple dimensions. The motion data, therefore, may include a change in dimension of the object, a change in position of a center of the object, a change in angle of the object in a parallel plane, and a change in angle of the object in a perpendicular plane. In some implementations, the motion data may include one type of motion or a combination of multiple types of motion. Additionally, the motion data may include total motion of the object across the video data.

The computing device then selects a subset of frames from the video data based on the determined motion of the identified object. The selection may take into account user preferences such types of motion, weighting of the types of motion, and a number of frames to select. In some implementations, a threshold is used to determine an amount of motion required between selected frames.

Using the selected frames, the computing device overlays instances of the object identified in the selected frames on a background to generate the action shot. The implementations described herein provide the ability for image capture of movement at a high frame rate and provide a large number of frames for automatic selection and generation of an action shot. Thus, the process for generating the action shot is efficient, not laborious, is performable automatically and without user intervention by a computing device, and does not require photograph editing skills. Furthermore, by selecting the frames based on determined motion of the object, the frames are intelligently selected to provide a professional quality action shot. For example, selection of frames can be configured to ensure the identified objects in the selected frames by the computing device do not overlap in the action shot and capture a variety of different motions of the object.

Example Term Definitions

An "action shot" is a single image that illustrates an action sequence of an object. An "action sequence" is an ordered set of motions showing movement of the object. Examples of an action shot and action sequence include an image showing a person jumping, a moon rising, a bird flying, and so forth.

"Video data" is digital content having a plurality of frames that may be processed by a computing device. The plurality of frames, for instance, may include digital images. Examples of video data include a video file (e.g., .avi, .wmv, .mov, .mp4, .flv), multiple digital images (e.g., .jpg, .gif, .bmp, .tiff, .png), and so forth.

A foreground and a background of a frame relates to a depth perceived along a z-axis of the frame. The "foreground" describes a region on the z-axis that is prominent and closest to a viewer. The "background" describes a region on the z-axis that is behind the foreground and is furthest from the viewer. Examples include a frame having a person standing in front of a tree wherein the foreground includes the person and the background includes the tree, a frame having a bird flying in front of a cloud wherein the foreground includes the bird and the background includes the cloud, and so forth.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automatic frame selection and action shot generation techniques described herein. The illustrated environment 100 includes video data 102 comprising multiple frames (e.g., frame 104, frame 106, frame 108, frame 110, and frame 112), a computing device 114 including an object tracking module 116, a motion module 118, a frame selection module 120, an action shot module 122, and an action shot 124.

The video data 102 includes a sequence of frames capturing motion of an object in a foreground, such as a person jumping. The video data 102 may take a variety of forms, such as a video file including .avi, .wmv, .mov, .mp4, .flv. Additionally or alternatively, the video data may include multiple photographic images including .jpg, .gif, .bmp, .tiff, .png. The multiple photographic images can be collected in rapid succession through a burst mode on a camera. A variety of content can be illustrated in the multiple frames, such as real life images, computer generated animations, hand-drawn cartoons, and so forth.

The video data 102 is provided to computing device 114. For example, the video data 102 may be stored in a memory of the computing device 114 (e.g., RAM, persistent storage). Alternatively, the video data 102 may be stored remotely and accessed by the computing device 114 using a wireless and/or wired network.

The computing device 114 may be configured in a variety of ways. The computing device 114, for instance, may be configured as a desktop computer, a laptop computer, a camera, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., cameras, mobile devices). Additionally, although a single computing device is shown in some examples, the computing device may be representative of a plurality of different devices, such as multiple servers utilized by a business to perform operations "over the cloud".

The computing device 114 is illustrated as including the object tracking module 116, the motion module 118, the frame selection module 120, and the action shot module 122, which are implemented at least partially in hardware of the computing device 114 (e.g., a processing system and computer readable storage medium). Operation of these modules is described in greater detail in the following discussion and corresponding figures to generate the action shot 124 from the video data 102. To do so, the computing device 114 uses these modules to automatically select frames from video data 102 and generate the action shot 124 from these frames.

The action shot 124 is a single photographic image (e.g., digital image) depicting motion of the object from a subset of selected frames of the video data 102. As illustrated in FIG. 1, the action shot 124 includes an overlay of the person identified in selected frames 104, 108, and 110 and not frames 106 and 112. The background of the action shot 124 can be selected by the computing device 114 from one of the selected frames, such as frame 104. Alternatively, the background of the action shot 124 can be a user specified background.

Figure 2:
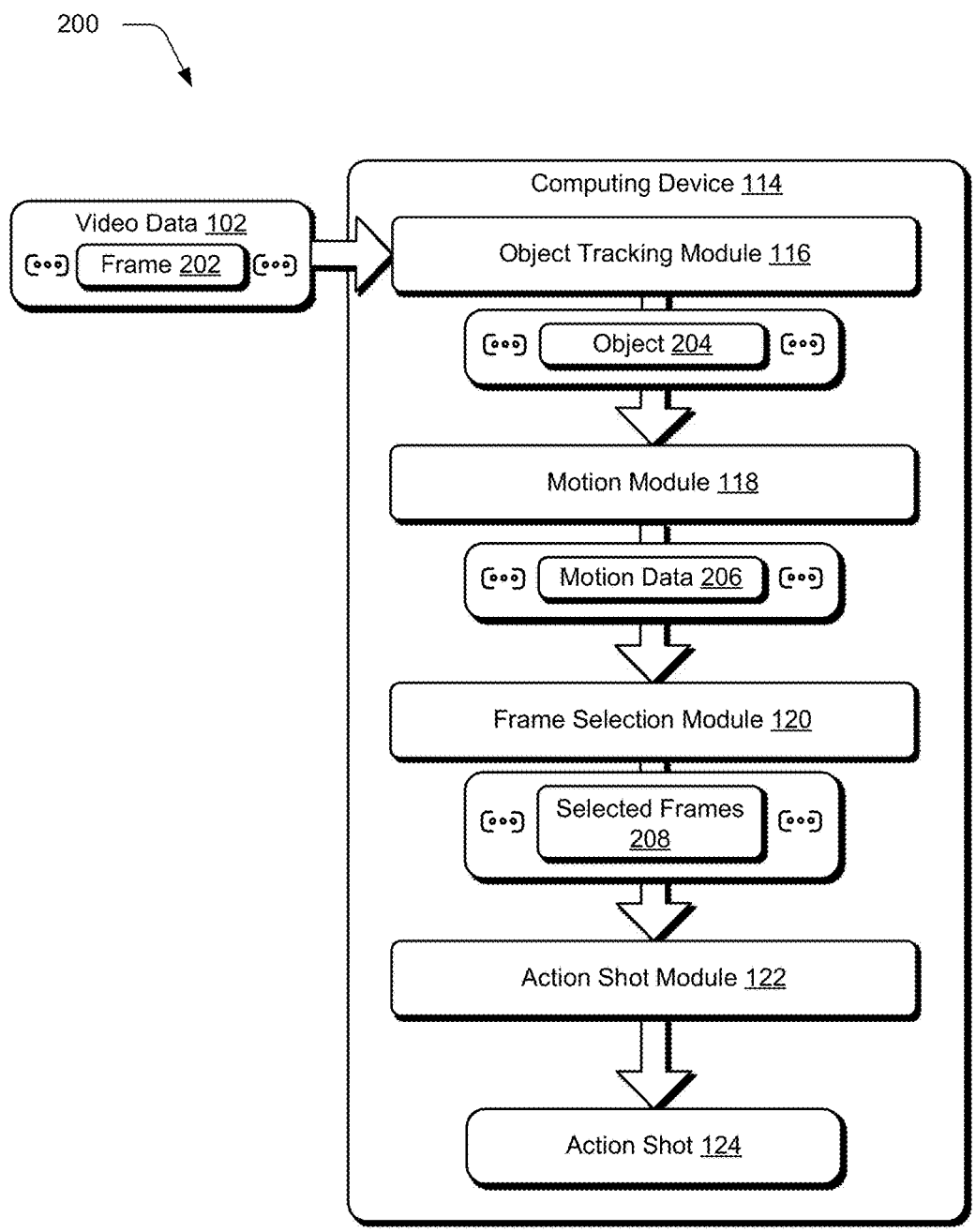
FIG. 2 depicts a system in an example implementation showing operation of a computing device of FIG. 1 in greater detail.

FIG. 2 depicts a system 200 in an example implementation showing operation of the computing device 114 of FIG. 1 in greater detail. To begin in this example, video data 102 having N total frames, represented by frame 202, is received by the object tracking module 116. A user of the computing device 114, for instance, may interact with a user interface of the computing device 114 to select the video data 102 that is provided to the object tracking module 116.

The object tracking module 116 is configured to identify an object in a foreground of the N frames. The identified object can be a person, an animal, an inanimate object, and so forth. The identification of the object by the object tracking module 116 may be performed in a variety of ways, such as responsive to a user input, automatically and without user intervention through machine learning, and so forth. The object tracking module 116, for instance, may automatically identify the object in each of the N frames. For example, the object tracking module 116 can identify the object in frame i using rectangle $R_i$ of length $L_i$ and breath $B_i$ to encompass the object. Other examples are also contemplated, such as identifying the object using an outline of the object or using another shape such as an oval or a trapezoid.

The motion module 118 receives the identification of the object 204 for each of the frames, where identifiable, from the object tracking module 116 as an input. The motion module 118 is configured to determine motion of the object 204 exhibited between the frames of the video data 102. The motion module 118, for instance, may iterate over consecutive frames 202 and determines motion data 206 that describes an amount of motion performed by the identified object between the frames. Between the N total frames, there may be N-1 corresponding motion data 206, such as between frames one and two, frames two and three, and so forth.

The motion data 206 may include a variety of types of motion data. For example, the motion data 206 may include translation motion of the object, such as a change in dimension of the object and a change in a position of a center of the object. In addition, the motion data 206 may include rotation motion, such as a change in angle of the object in a parallel plane and a change in angle of the object in a perpendicular plane. The different types of motion data are illustrated in FIG. 3 and described in further detail below.

Figure 3:
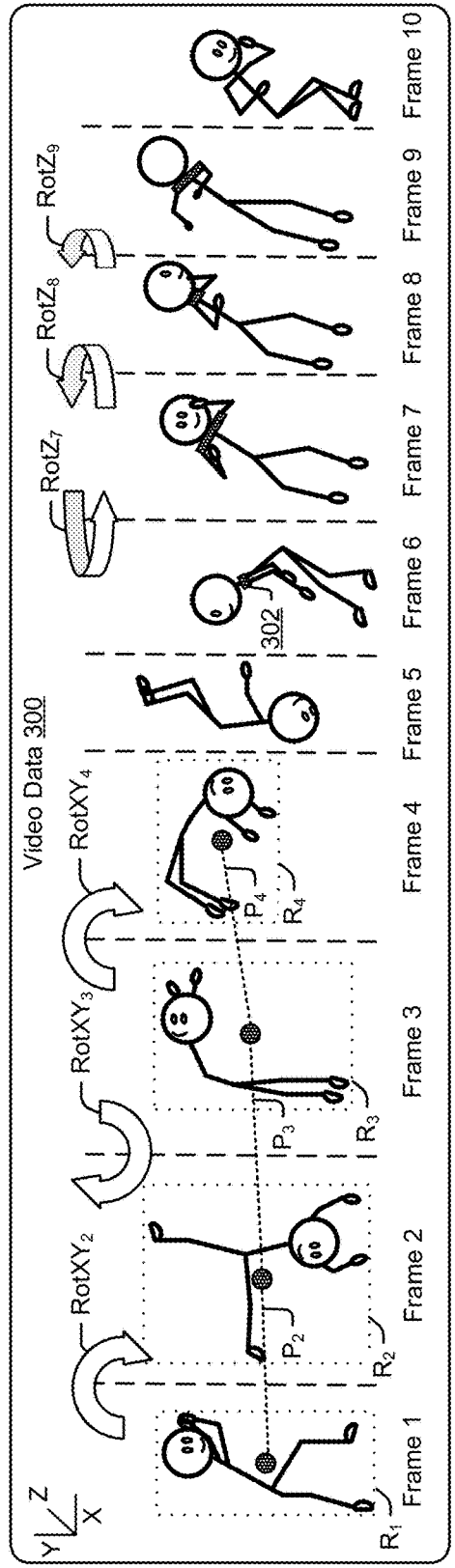
FIG. 3 depicts an example video data capturing different types of motion of an object.

FIG. 3 illustrates example video data 300 depicting a person jumping, flipping, and twisting over ten frames. The person is identified by the object tracking module 116 using rectangles, such as rectangles $R_1$, $R_2$, $R_3$, and $R_4$ illustrated in frames 1, 2, 3, and 4 respectively.

The motion module 118 in this instance uses the change in dimension of the object to determine motion of the object moving towards or away from a point of view of the frame as a size of the object becomes larger or smaller. Additionally, the motion module 118 can use the change in dimension of the object to determine motion of the object expanding or contracting, such as a person jumping with legs and arms outstretched from a crouch position. The motion module 118 determines the change in dimension of the object ($D_i$) between frame i and frame i-1 based on a change in a size of the rectangle provided by the object tracking module 116 according to the following equation:

$$D_i = \left|\frac{L_i - L_{i-1}}{L_{i-1}}\right| + \left|\frac{B_i - B_{i-1}}{B_{i-1}}\right|$$

where $L_i$ and $B_i$ are the length and breath of rectangle $R_i$ in frame i, $L_{i-1}$ and $B_{i-1}$ are the length and breath of rectangle $R_{i-1}$ in frame i-1, and i is an integer number between two and N.

An example of the change in dimension of the object is illustrated in FIG. 3 as the size of the rectangles $R_1$, $R_2$, $R_3$, and $R_4$ in frames 1, 2, 3, and 4 change as the person extends legs and arms during the cartwheel and back flip.

The motion module 118 can also use the change in the position of the center of the object to determine motion of the object across a horizontal axis (e.g., x-axis) and a vertical axis (e.g., y-axis). The motion module 118 determines the change in the position of the center of the object based on the rectangle $R_i$ provided by the object tracking module 116. By determining a center of the rectangle $R_i$ and mapping the center to a coordinate on the horizontal axis ($Rx_i$) and to a coordinate on the vertical axis ($Ry_i$), the motion module 118 determines the change in the position of the center of the object ($P_i$). This is based on a distance between the center of the rectangle in frame i and frame i-1, as shown in the following equation:

$$P_i = |\sqrt{(Rx_i - Rx_{i-1})^2 + (Ry_i - Ry_{i-1})^2}|$$

where $Rx_i$ and $Ry_i$ are the coordinate positions of the center of the rectangle of frame i on the x-axis and y-axis respectfully, $Rx_{i-1}$ and $Ry_{i-1}$ are the coordinate positions of the center of the rectangle of frame i-1 on the x-axis and y-axis respectfully, and i is an integer number between two and N.

An example of the change in the position of the center of the object is illustrated in FIG. 3 as distances $P_2$, $P_3$, and $P_4$ between circles positioned at centers of the rectangles $R_1$, $R_2$, $R_3$, and $R_4$. The change in the position of the center of the object is determined by the motion module 118 as the person (i.e., the object) moves up and to the right between frames 1, 2, 3, and 4.

The motion module 118 can also use the change in angle of the object in a plane parallel to the frames to determine motion of the object rotating in a XY plane formed along the horizontal axis and vertical axis of the frames. The motion module 118 determines the change in angle of the object in the parallel plane ($RotXY_i$) based on an absolute value of a difference between the angles of the object determined in the parallel plane in frame i and frame i-1.

In one implementation, the motion module 118 uses tracker points within the rectangle identified by the object tracking module 116 in order to determine the angle of the object in the parallel plane. For example, two tracker points may be positioned on the object, such as one of the head and another on the lower body based on a user input and/or machine learning. The motion module 118 determines the amount the two tracker points rotate, clockwise or counterclockwise, around a third point, such as a center of the object. In another implementation, the motion module 118 can use facial detection to identify a location of a face and based on the location, determine an amount of rotation of the face.

An example of the change in the angle of the object in the parallel plane is illustrated in FIG. 3 as rotations $RotXY_2$, $RotXY_3$, and $RotXY_4$. These rotations are determined by the motion module 118 as the person performs a cartwheel and back flip in frames 1, 2, 3, and 4.

The motion module 118 can also use the change in angle of the object in a plane perpendicular to the frames to determine motion of the object rotating in a Z plane formed along a third axis (Z) perpendicular to the horizontal and vertical axes of the frame. The motion module 118 determines the change in angle of the object in the perpendicular plane ($RotZ_i$) based on an absolute value of a difference between the angles of the object determined in the perpendicular plane of frame i and frame i−1.

In one example, the motion module 118 uses facial and/or body detection within the rectangle identified by the object tracking module 116 to determine the angle of the object in the perpendicular plane. By detecting the face and body of the object, the motion module 118 can determine a direction the face and body are pointing.

An example of a change in angle of the object in the perpendicular plane is illustrated in FIG. 3 as $RotZ_7$, $RotZ_8$, and $RotZ_9$, as the person twists counter-clockwise in the air across frames 6, 7, 8, and 9. In frame 6, the motion module 118 detects the face and body of the person, determines that 50% of the face is visible and that the face and body are pointing towards the left. In frame 7, the motion module 118 detects the face and body of the person, determines that 100% of the face is visible and that the face and body are pointing forwards towards the point of view of the frame. In frame 8, the motion module 118 detects the face and body, determines that 50% of the face is visible and that the face and body are pointing towards the right. In frame 9, the motion module 118 detects only the body, determines that 0% of the face is visible and that the person is pointing backwards away from the point of view of the frame. Based on the changing direction of the face and body, the motion module 118 determines the change in angle of the object in the perpendicular plane between each frame.

Additionally or alternatively, the motion module 118 uses an amount of expansion and contraction of a width of the object to determine the change in angle of the object in the perpendicular plane. Continuing with the above example, the motion module 118 can detect a width of the person's shoulders in frames 6, 7, 8, and 9 of FIG. 3. The width of the shoulders is illustrated by rectangle 302. As the person rotates in the perpendicular plane, the width of the shoulders increase and decrease. A full width of rectangle 302 can be set as W and determined from a frame illustrating the person facing forward or backwards, such as frame 7. In frame 6, the motion module 118 detects the width of the rectangle 302 as a fraction of the full width W, such as 0.1 W. In frames 7, 8, and 9, the motion module 118 determines the width of the shoulders as W, 0.3 W, and 0.8 W respectively. Based on the change in the width, the motion module 118 determines the change in angle of the object in the perpendicular plane between each frame.

As illustrated in FIG. 3, frames 1-10 are consecutive frames. The above techniques and motion data may also be determined when frames 1-10 are separated by additional frames in which the size, position, direction, and/or width of the object may not be changing.

In addition to the above types of motion data 206, the motion module 118 determines a total motion of the object by summing the motion data 206 across the N total frames of the video data 102. The total motion can be determined for any combination of the above types of motion data. For example, the following equations calculate a total change in dimensions of the object ($D_T$), a total change in the position of the center of the object ($P_T$), a total change in angle of the object in the parallel plane ($RotXY_T$), and a total change in angle of the object in the perpendicular plane ($RotZ_T$).

$$D_T = \sum_{i=2}^{N} D_i$$

$$RotXY_T = \sum_{i=2}^{N} RotXY_i$$

$$RotZ_T = \sum_{i=2}^{N} RotZ_i$$

$$P_T = \sum_{i=2}^{N} P_i$$

Returning to FIG. 2, the frame selection module 120 receives the motion data 206 from the motion module 118 as an input. As described above, the motion data 206 can include one of the above types of motion data or a combination thereof. The frame selection module 120 is configured to automatically select a subset of frames based on the determined motion of the object provided in the motion data 206. The frame selection module 120 selects the frames in order to depict an action sequence of the identified object.

The frame selection module 120 scores each frame based on an amount of motion exhibited. The amount of motion can include any one or a combination of the types of motion data 206 described above. The score ($G_i$) is a weighted summation of a fraction of the total motion observed between frame i and a previous frame i−1, as shown in the following equation.

$$G_i = W_1 \frac{D_i}{D_T} + W_2 \frac{P_i}{P_T} + W_3 \frac{RotXY_i}{RotXY_T} + W_4 \frac{RotZ_i}{RotZ_T}$$

Weights $W_1$, $W_2$, $W_3$, and $W_4$ are assigned to each of the types of motion data 206 used by the frame selection module 120. Each weight is a fractional value ranging from zero to one and a summation of the weights equals one. The weights may be equal, such as $W_1=W_2=W_3=W_4=0.25$. Alternatively, the weights may be unequal, such as $W_1=0.3$, $W_2=0.6$, $W_3=0.1$, and $W_4=0$. Increasing the weight for one of the motion types increases the score for frames exhibiting that type of motion and increases the probability of these frames being selected. The weights may be predefined by the frame selection module and/or selected based on a user input.

Furthermore, the weights may be used to achieve a desired effect in the action shot 124. For example, the frames can be selected in order to comprise of non-overlapping instances of the object by increasing the weight corresponding to the change in position of the center of the object. This is beneficial for creating an action shot 124 with distinct and separate instances of the object.

In addition to determining a score for each frame, the frame selection module 120 determines a minimum amount of motion required for selecting the frames. The minimum amount of motion is represented by a threshold (T), which is determined based on the total motion, weights, and a number of frames to be selected (M), according to the following equation.

$$T = \frac{W_1 D_T + W_2 RotXY_T + W_3 RotZ_T + W_4 P_T}{M}$$

The number of frames to be selected can be automatically determined by the frame selection module 120 based on the total number of frames N or set according to a user input.

After determining the threshold, the frame selection module 120 selects a starting frame and adds the starting frame to a list of selected frames 208. The starting frame can be a first frame in the video data 102 and/or an initial frame selected based on a user input.

After selecting the starting frame, the frame selection module 120 selects additional frames based on an amount of motion determined between the frame and the previous selected frame. The amount of motion is represented by a cumulative score ($C_i$), which is a summation of the scores from all of the frames between frame i and the previously selected frame L, as shown in the below equation.

$$C_i = \sum_{j=L+1}^{i} G_j$$

As the frame selection module 120 iterates over successive frames, the frame selection module 120 compares the cumulative score of a current frame i to the threshold. When the cumulative score is greater than or equal to the threshold, the frame is selected and added to the list of selected frames 208. The frame selection module 120 updates the previously selected frame number L and continues determining the cumulative score for the next frames. When the cumulative score is less than the threshold, the frame selection module 120 continues determining the cumulative score for the next frame.

Once the frame selection module 120 selects M frames and/or evaluates the cumulative score for each of the N frames, the frame selection module outputs the selected frames 208. For example, the selected frames 208 can be saved as individual photographic images and/or provided to another module, such as the action shot module 122.

Figure 4:
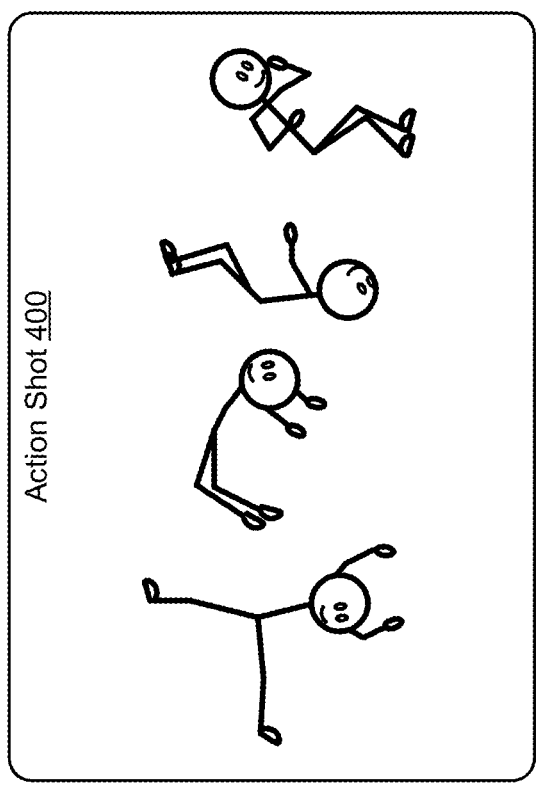
FIG. 4 depicts an example action shot.

The action shot module 122 receives the selected frames 208 from the frame selection module 120 as input. The action shot module 122 is configured to automatically generate the action shot 124 by overlaying the identified object in each of the selected frames 208 onto a background. FIG. 4 illustrates an example action shot 400 created from selected frames 2, 4, 5, and 10 of video data 300 in FIG. 3.

In some implementations, the action shot module 122 adjusts an opacity of the identified object in the action shot 124. This is beneficial when the identified object in the selected frames 208 overlap in the action shot 124. As an example, the opacity of the identified object can incrementally increase across the selected frames in order to make the object in the last selected frame stand out while gradually fading the previous movements.

In some examples, the background is generated from one of the selected frames 208, such as the starting frame. Other examples are also contemplated, such as receiving a specified background from a user input.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

Figure 5:
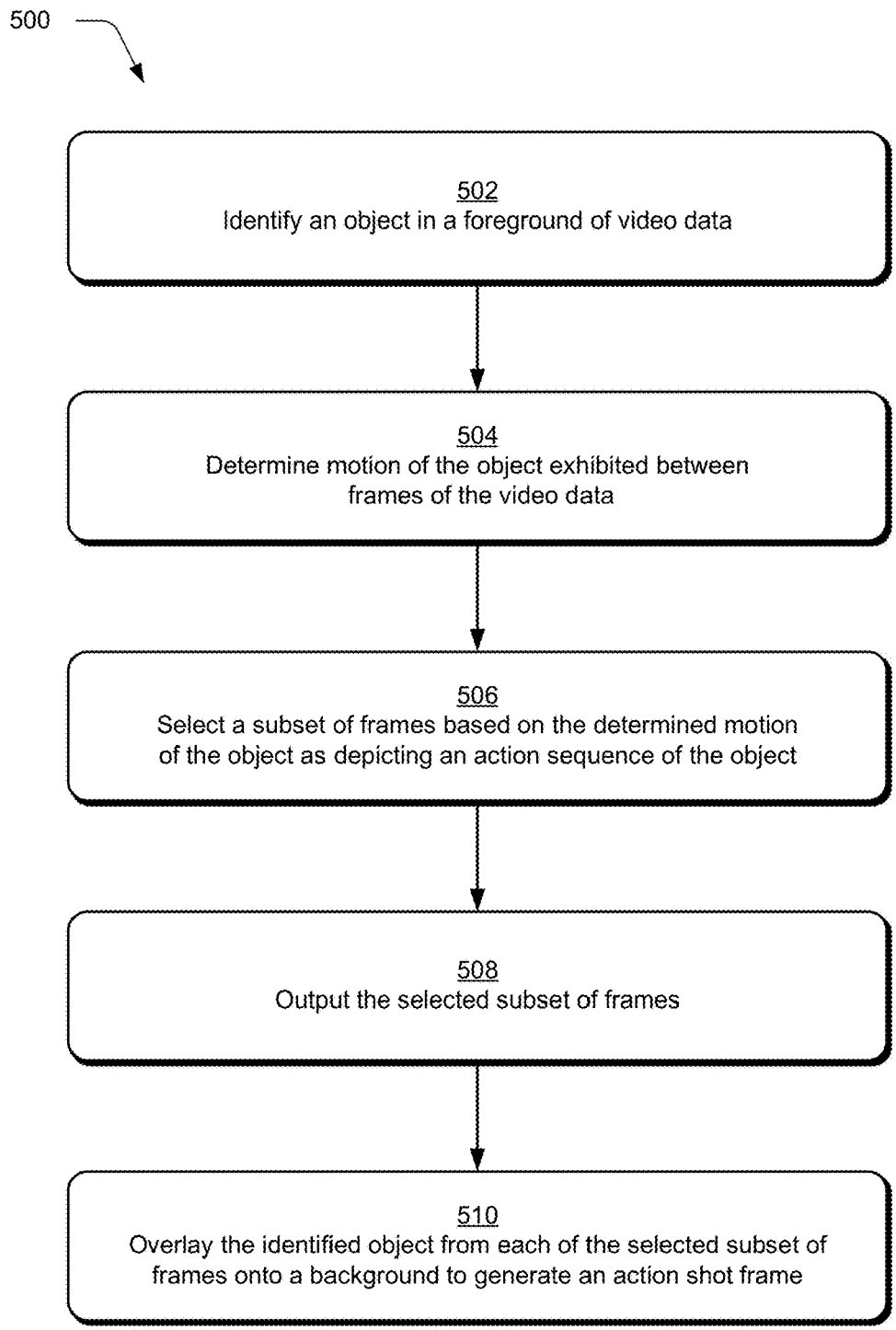
FIG. 5 is a flow diagram depicting a procedure in an example implementation in which techniques for automatic frame selection and action shot generation are employed.

FIG. 5 depicts a procedure 500 in an example implementation in which frames from video data are automatically selected and an action shot 124 is automatically generated. An object that is in a foreground of the video data is identified by a computing device using the object tracking module 116 (block 502). The object, for instance, may be a person, an animal, an inanimate object, and so forth.

A determination is then made by the computing device as to motion of the object exhibited between frames of the video data (block 504). The motion module 118 determines the type of motion, such as the change in the dimensions of the object, the change in the position of the center of the object, the change in angle of the object in the parallel plane, and the change in angle of the object in the perpendicular plane. The motion module 118 then determines the total motion of the object across all of the frames of the video data.

A frame selection module 120 is then used by the computing device to select a subset of frames based on the determined motion of the object depicting an action sequence of the object (block 506). The frame selection module 120, for instance, may score each frame based on a fraction of the total motion. The frame selection module 120 then determines a cumulative score for each frame and compares the cumulative score to a threshold. When the cumulative score is greater than or equal to the threshold, the frame selection module 120 selects the frame and adds the frame to a list of selected frames. The selected subset of frames are then outputted by the frame selection module 120 (block 508).

An action shot module 122 is then used by the computing device to overlay the identified object from each of the selected subset of frames onto a background to generate an action shot frame (block 510). The resulting action shot frame comprises a digital image that captures an action sequence of the identified object, examples of which are illustrated in action shot 124 and action shot 400.

Example System and Device

Figure 6:
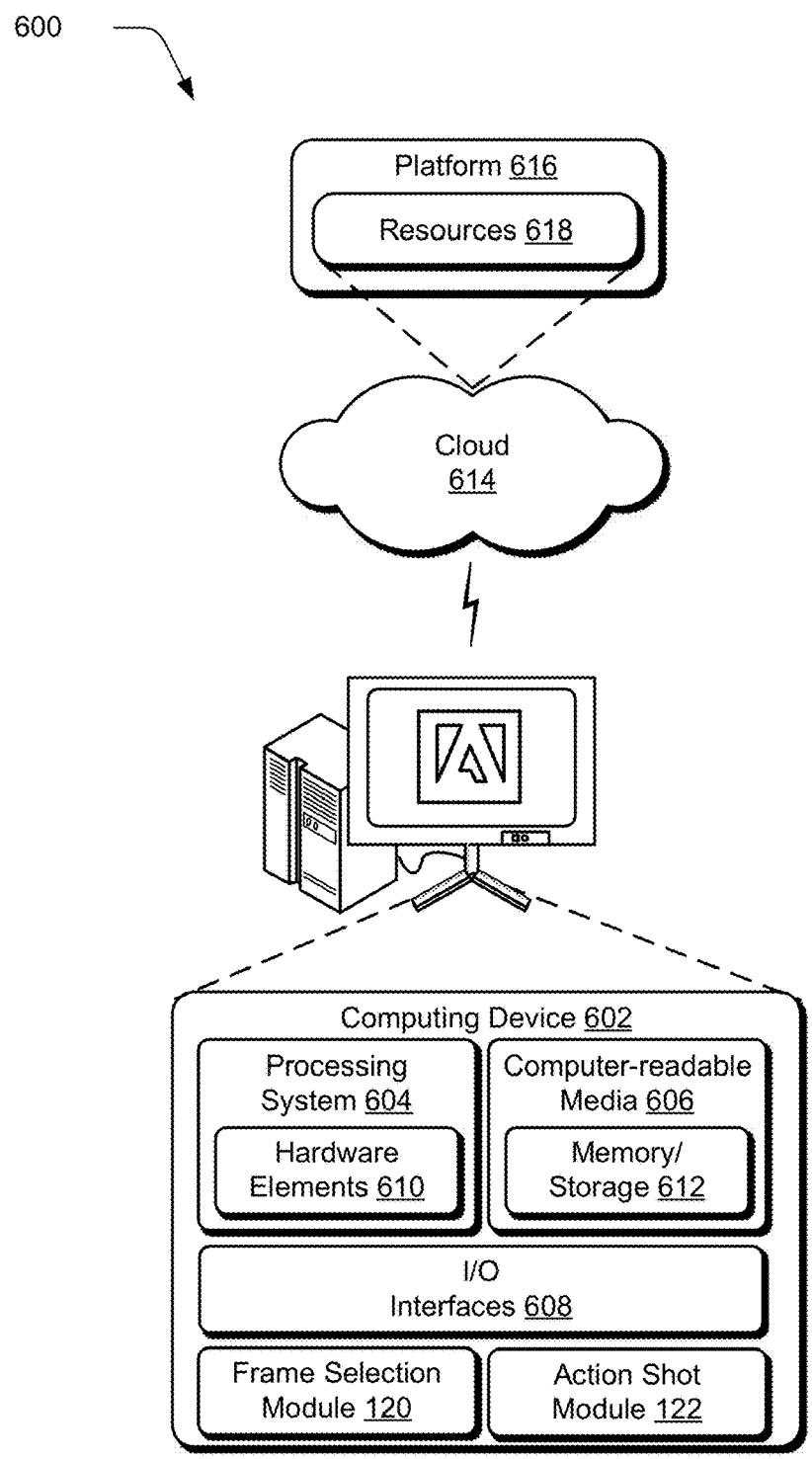
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the frame selection module 120 and action shot module 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to select frames from video data describing object motion, a method implemented by a computing device, the method comprising:
   identifying, by the computing device, an object in a foreground of the video data;
   determining, by the computing device, motion of the object exhibited between a plurality of frames of the video data;
   selecting, by the computing device, a subset of the plurality of frames based on the determined motion of the object as depicting an action sequence of the object;
   generating, by the computing device, an action shot frame as a single frame as including a plurality of instances of the object taken from the subset of the plurality of frames; and
   outputting, by the computing device, the action shot frame.

2. The method as described in claim 1, wherein the identifying and the generating are performed for a plurality of instances of object such that the action shot frame includes the plurality of instances of the object in the single frame.

3. The method as described in claim 1, wherein the background is a background taken from one frame of the selected subset of the plurality of frames.

4. The method as described in claim 1, wherein the determining is based at least in part on determining a change in dimension of the object exhibited between the plurality of frames.

5. The method as described in claim 1, wherein the determining is based at least in part on determining a change in an angle of the object exhibited between the plurality of frames, the angle of the object defined based on a plane parallel to the plurality of frames.

6. The method as described in claim 1, wherein the determining is based at least in part on determining a change in an angle of the object exhibited between the plurality of frames, the angle of the object defined based on a plane perpendicular to the plurality of frames.

7. The method as described in claim 1, wherein the determining is based at least in part on determining a change in a position of a center of the object exhibited between the plurality of frames.

8. The method as described in claim 1, wherein the determined motion of the object is a weighted summation of at least two of the following:
   a change in dimension of the object;
   a change in a first angle of the object, the first angle of the object defined based on a plane parallel to the plurality of frames;
   a change in a second angle of the object, the second angle of the object defined based on a plane perpendicular to the plurality of frames; or
   a change in a position of a center of the object.

9. The method as described in claim 8, wherein weights of the weighted summation are defined based on a user input.

10. The method as described in claim 1, wherein the determining further comprises determining a total motion of the object exhibited by the plurality of frames in the video data.

11. The method as described in claim 10, wherein the selecting further comprises selecting a frame from the plurality of frames based on the frame having a cumulative score greater than a threshold, the cumulative score based on a fraction of the determined total motion of the object.

12. The method as described in claim 1, wherein the selected subset of frames comprises non-overlapping instances of the object.

13. In a digital medium environment to select frames from video data describing object motion, a system comprising:
   an object tracking module implemented at least partially in hardware of a computing device to identify an object in a foreground of the video data;
   a motion module implemented at least partially in hardware of a computing device to determine motion of the object exhibited between a plurality of frames of the video data;
   a frame selection module implemented at least partially in hardware of a computing device to select a subset of the plurality of frames based on the determined motion of the object as depicting an action sequence of the object; and
   an action shot module implemented at least partially in hardware of a computing device to overlay a plurality of instances of the identified object taken from the selected subset of the plurality of frames onto a background to generate a single action shot frame having the plurality of instances of the identified object.

14. The system as described in claim 13, wherein the determined motion of the object is based on at least two of the following:
   a change in dimension of the object;
   a change in a first angle of the object, the first angle of the object defined based on a plane parallel to the plurality of frames;
   a change in a second angle of the object, the second angle of the object defined based on a plane perpendicular to the plurality of frames; or
   a change in a position of a center of the object.

15. The system as described in claim 13, wherein:
the motion module is further configured to determine a total motion of the object exhibited by the plurality of frames in the video data; and
the frame selection module is further configured to select a frame from the plurality of frames as part of the subset based on the frame having a cumulative score greater than a threshold, the cumulative score based on a fraction of a determined total motion of the object.

16. The system as described in claim 13, wherein the background is taken from a single frame of the selected subset of the plurality of frames.

17. In a digital medium environment to select frames from video data describing object motion, a system comprising:
means for identifying an object in a foreground of the video data;
means for determining motion of the object exhibited between a plurality of frames of the video data, the determined motion of the object comprises a weighted summation of at least two of the following:
a change in dimension of the object;
a change in a first angle of the object, the first angle of the object defined based on a plane parallel to the plurality of frames;
a change in a second angle of the object, the second angle of the object defined based on a plane perpendicular to the plurality of frames; or
a change in a position of a center of the object;
means for selecting a subset of the plurality of frames based on the determined motion of the object as depicting an action sequence of the object; and
means for outputting the selected subset of the plurality of frames.

18. The system as described in claim 17, further comprising means for overlaying the identified object in each of the selected subset of the plurality of frames onto a background to generate an action shot frame.

19. The system as described in claim 18, wherein the overlaying of the identified object includes changing an opacity of the identified object in each of the selected subset of the plurality of frames.

20. The system as described in claim 17, wherein the outputting means outputs the selected subset of the plurality of frames as a single action shot frame having a plurality of instances of the object taken from the subset of the plurality of frames.

* * * * *